United States Patent [19]

Couvillon

[11] 3,852,752

[45] Dec. 3, 1974

[54] DIFFERENTIAL AMPLITUDE ANGLE GUIDANCE

[75] Inventor: James B. Couvillon, Dallas, Tex.

[73] Assignee: Texas Instruments Incorporated, Dallas, Tex.

[22] Filed: Dec. 26, 1972

[21] Appl. No.: 318,077

[52] U.S. Cl.......................... 343/108 M, 343/106 R
[51] Int. Cl.............................................. G01s 1/14
[58] Field of Search .................... 343/108 M, 106 R

[56] References Cited
UNITED STATES PATENTS
3,197,777   7/1965   McKay.......................... 343/108 M Primary Examiner—Maynard R. Wilbur
Assistant Examiner—Richard E. Berger
Attorney, Agent, or Firm—Harold Levine; Rene E. Grossman; Alva H. Bandy

[57] ABSTRACT

An instrument landing system is operable with a scanning beam antenna system for providing glideslope and runway centerline indications to an aircraft. An azimuth antenna rotates in a plane parallel to the earth's surface. An elevation antenna rotates in a plane normal to the earth's surface. A first pair of AM modulated tones represents the instantaneous position of the azimuth antenna and a second pair of AM modulated tones represents the instantaneous position of the elevation antenna. A first carrier signal is modulated with the first pair of tones and a second carrier signal is modulated with the second pair of tones. The first and second carrier signals are received in the aircraft and when the first and second carrier signals illuminate the position in space occupied by the aircraft, the two pairs of tones are detected and their relative amplitudes are compared, wherein equal amplitudes indicate proper glideslope and/or centerline of runway.

6 Claims, 5 Drawing Figures

DIFFERENTIAL AMPLITUDE ANGLE GUIDANCE

This invention is directed to a microwave landing system and is more particularly directed to an airborne guidance system for use with microwave landing systems.

Microwave landing systems are now being developed which will be the dominant terminal landing guidance systems in the years to come. These microwave landing systems require both ultrasophisticated airborne landing aids with the capability for automatic "hands off" landing and, in addition, require low cost, simple airborne systems for the guidance of small aircraft in the terminal area.

This invention is primarily directed to the low cost, simple airborne guidance systems for the guidance of small aircraft in the terminal area.

The present instrument landing system provides guidance, however it requires extra exact terrain contouring at spectific sites to obtain the required applied slope accuracy. In the present instrument landing systems once the glideslope is set it is difficult to change.

It is therefore an object of this invention to provide a new and improved airborne landing system for use with microwave landing systems.

It is another object of this invention to provide a low cost airborne system for use with microwave landing systems.

Another object of this invention is to provide an airborne guidance system which will provide accurate runway centerline and glideslope data at airports with lightly varying terrain.

Another object of this invention is to provide an airborne guidance system where the glideslope may be set at any airport by adjusting a tone modulation crossover.

It is another object of this invention to provide an airborne guidance system which can be operated independently or simultaneously at any airport with the ultrasophisticated microwave landing system digital angle system.

It is another object of this invention to provide an airborne guidance system which is compatible with the present airplane cockpit displays.

Figure 1:
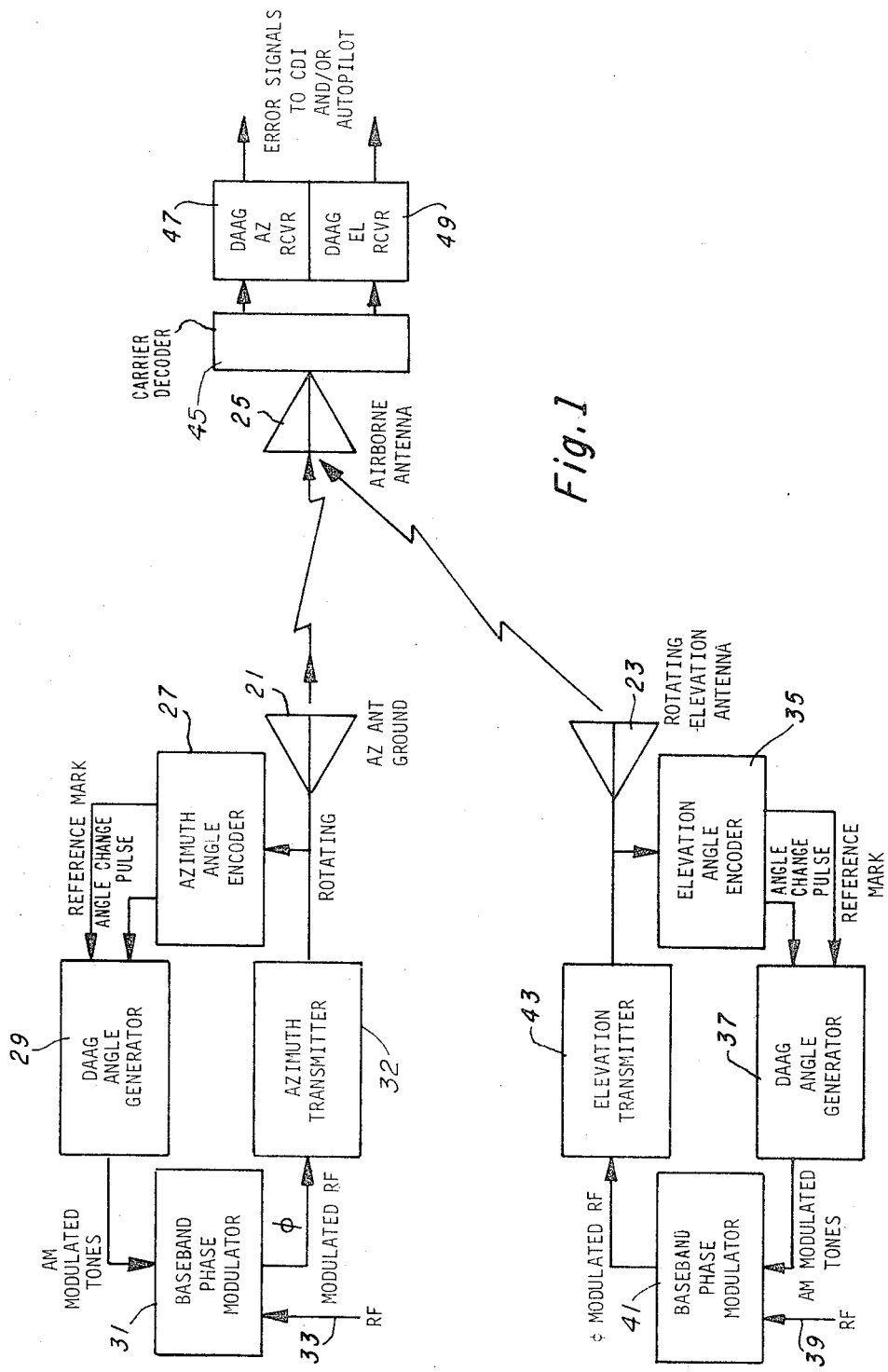
FIG. 1 shows the system block diagram.

Referring now to FIG. 1, a block diagram is shown of the guidance system. This guidance system is termed a differential amplitude angle guidance system. Two carrier signals are transmitted in this system. One from the rotating azimuth antenna 21 and the other from the rotating elevation antenna 23. Two video tones, for example one at 45 KHz and the other at 49 KHz, phase modulate each radio frequency carrier.

The carrier signals are mechanically linked to the antennas by way of the digital shaft position encoders. The rotating antennas positions are absolutely sensed, encoded and transmitted so that there is a direct connection between the position of the antenna and the signal transmitted.

Two tones are sent on each transmitted carrier signal, two tones on the elevation antenna signal and two tones on the azimuth antenna signal. These tones are the 49 KHz and the 45 KHz signals which phase modulate the carrier signals The difference is taken of these two tones in the airborne decoder separately for each transmitted signal. The carrier signal may change; however, since the decoder detects the difference it is not dependent upon the absolute value of the carrier signal itself.

This system is constructed to operate on a scanning beam rather than a fixed beam such as the present ILS system. The present ILS is a static system since the antennas are fixed. This system has a rotating signal in space with the rotation position of the two antennas encoded in the signals. The advantages of a rotating antenna over a fixed antenna are well known since this is the basis for the MLS system itself.

This system requires only a small amount of the bandwidth, approximately 3 percent, of the MLS system to provide this low cost airborne guidance system. This system will ride piggyback on the MLS system without in any way causing any detriment to the operation of the present MLS system.

In the block diagram (FIG. 1), the baseband phase modulators 31 and 34 modulate other signals. The transmitters 32 and 43 are both needed for the MLS, so what is unique and needed separately are the two DAAG angle generators 29 and 43 which encode the antenna position and then the decoders (FIG. 4) in the airborne receiver to decode its position in space.

Figure 4:
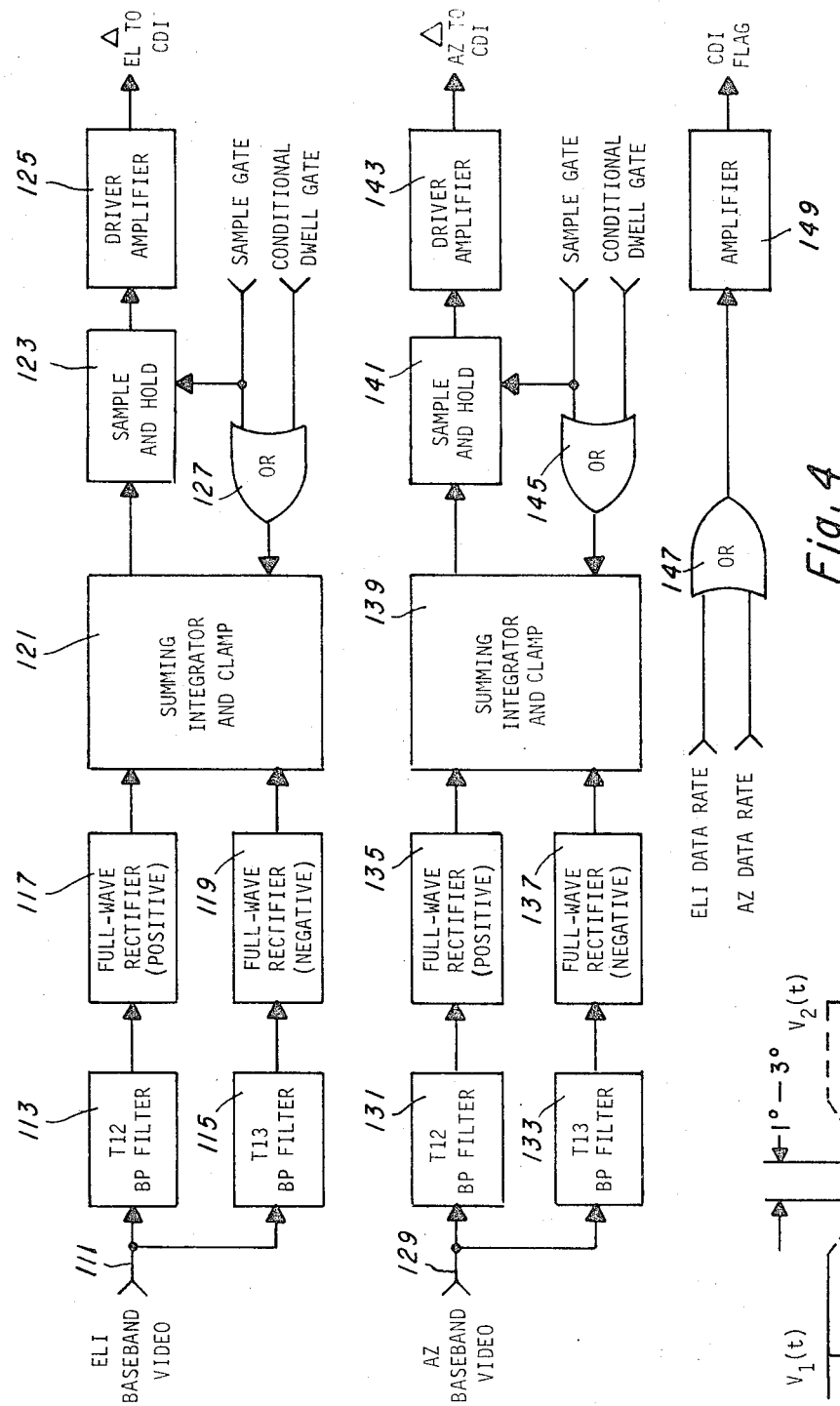
FIG. 4 shows another block diagram of the Airborne Decoder.

An airplane has two identical channels which will give two indications of the errors. This gives a display output from driver amplifiers 125 and 143 (FIG. 4). It gives indications to the CDIs which are course and direction indicators. The course direction indicators are tied together. One gives up and down and one gives righ or left indications. Therefore, what the pilot will do is keep the cross hairs aligned to keep them on the glideslope and the localizer. The glideslope is elevation and the localizer is azimuth or runway centerline.

It should be pointed out that this system needs no computing ability, it is strictly analog in nature. The system will work without modification into the present autopilot/autoland systems.

Referring now to FIG. 1 for a block diagram of the differential amplitude angle guidance system, the azimuth antenna ground antenna 21 is a rotating antenna to provide the azimuth angle and the rotating elevation antenna 23 is a constantly rotating antenna and provides the elevation angele. The azimuth and elevation antennas both transmit and genreatre flat, narrow band beams scanning in a time non-synchronized manner. The system will also operate with synchronized antenna systems. These antennas generate the normal microwave beam for the microwave landing systems. This beam as generated is a scanning beam. The moving microwave beam provides for a rejection of reflections, provides volumetric coverage, airborne selectivity and flexibility of approach path. These are the same antennas used in the regular microwave landing systems. However, this invention provides for a low cost and simple system for guidance of small aircraft. Thus, the same components are used in this low cost system which is termed the differential amplitude angle guidance system as used in the microwave system. However, the airborne portion of the microwave system while having a great capacity is simply too expensive for a small aircraft. Therefore, this invention provides for a low cost airborne system. The two generated beams from the azimuth antenna 21 and the elevation antenna 23 are received by the airborne antenna 25.

Both the azimuth and the elevation antennas are constantly rotating. The position of the azimuth antenna is sensed and encoded by the azimuth angle encoder 27. The azimuth angle enoder produces a reference mark and angle change pulses which are applied to the DAAG angle generator 29 to produce AM modulated tones which are applied to the baseband phase modulator 31. The tones generated by the DAAG angle generator 29 modulate the RF signal 33 in the baseband phase modulator 31 producing a modulated RF signal which is transmitted through the azimuth antenna from the azimuth transmitter 32 and received by the airborne antenna 25. In a like manner, the position of the elevation antenna 23 is sensed and encoded by the elevation encoder 35 to produce angle change pulses and reference mark for the DAAG angle generator 37. The DAAG angle generator produces AM modulated tones to modulate the RF signal 39 in the baseband phase modulator 41. The elevation modulated RF signal is transmitted by the elevation transmitter 43 from the elevation antenna 23 where it is picked up by the airborne antenna 25. Both the azimuth generated signal and the elevation generated signal are modulated by two video tones, one at 45 KHz and 49 KHz, indicating the azimuth angle and the elevation angle. These are received by the airborne antenna 25 where they are decoded by the airborne carrier decoder 45 so that the azimuth signal is received at the DAAG azimuth receiver 47 and the elevation signal is received by the DAAG elevation receiver 49. The error signals after being decoded by decoders 47 and 49 are applied to the CDI where they are displayed to the pilot indicating the error from the centerline and glideslope or they may be applied directly to an autopilot.

Figure 2:
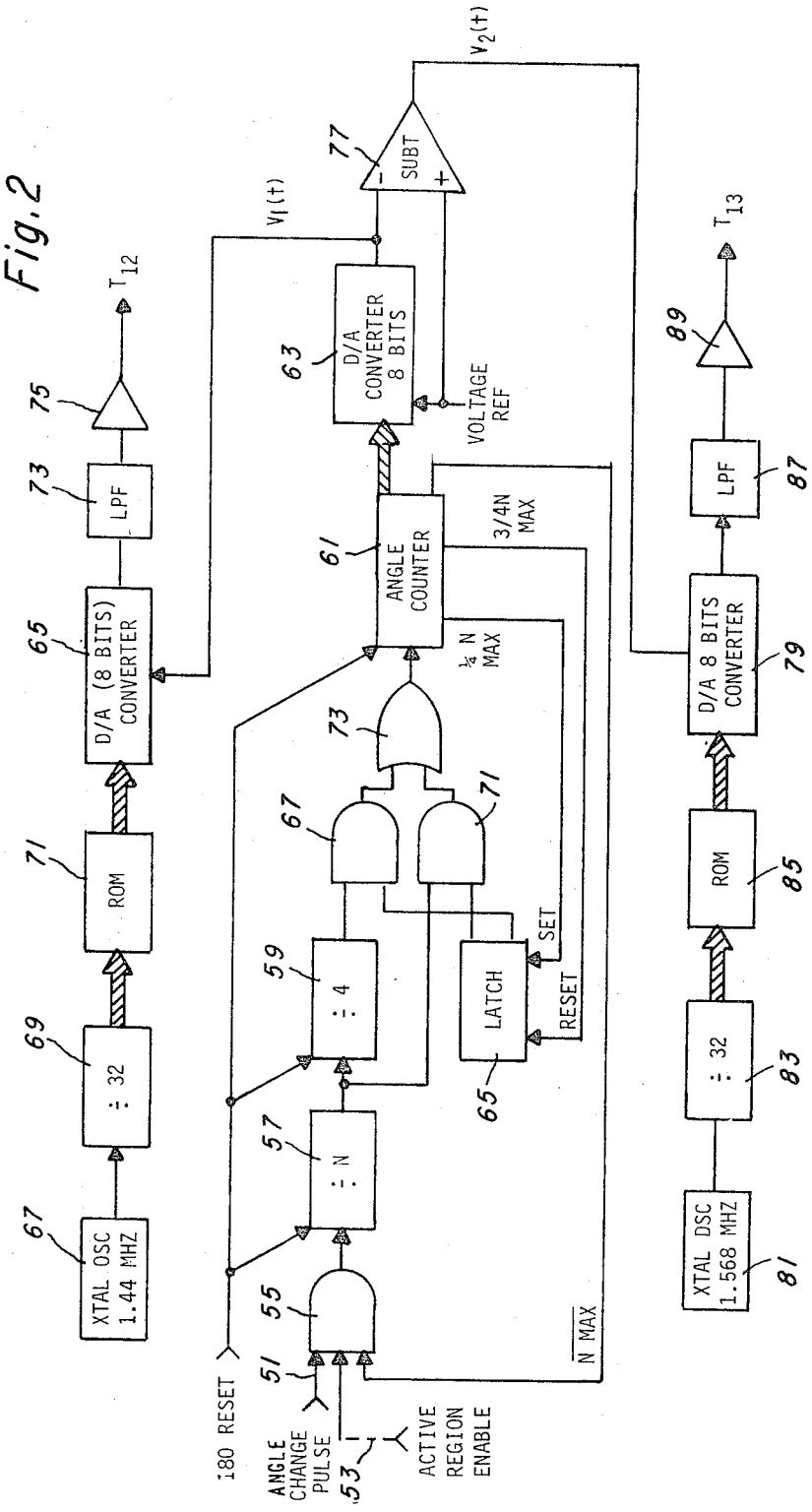
FIG. 2 shows a diagram of the Ground Encoder.

FIG. 2 slows a block diagram of the encoder and angle generator which may be used for the azimuth and the elevation angle encoders 29 and 37 shown in FIG. 1. This particular description describes the azimuth angle relative to runway centerline. The same encoder may be used by the elevation angle using an elevation change pulse rather than the azimuth change pulse. This encoder uses baseband tones number 12 and 13 (45 and 49 KHz, respectively) to modulate a voltage which is proportional to the azimuth angle relative to runway centerline. The encoder 27 will encode the rotating signal and apply the angle change pluse to terminal 51. The azimuth change pulse is AND gated with the active region enable signal received on input terminal 53 and with the Nmax signal at AND gate 55. The active region enable signal is approximately plus or minus 2.5 degrees for the long runway systems to plus or minus 7.5 degrees for the shortest runways. The scaling of the active region is distorted by the runway length as is the present ILS systems. The Nmax is related to the change of slope break points. The output from AND circuit 55 is then divided in divide by N circuit 57. The divide by N is set at either 1 or 2 with the 1 degree or 3 degree system, respectively so that the dynamic range of the digital to analog converter is not exceeded. The output of divider 57 is divided by divide by 4 circuit 59 and fed into an angle counter 61 which in turn feeds into an 8-bit digital to analog converter 63 whose output voltage is proportional to the azimuth angle relative to the runway centerline. Fed back through a latch circuit 65 NAD circuits 67 and 71 and OR circuit 73 are one-fourth $N_{max}$ and three-fourths $N_{max}$ signals which determine the two break points for the four to one slope differential. (This provides more accurate proportional guidance in the region plus or minus 0.5 degrees and AND or minus 1.5 degrees about the correct glideslope or runway centerline for the 1 degree and 3 degree system, respectively.) The voltage $V_1(t)$ from the D/A converter 63 is fed directly into an 8-bit D/A converter 65 for tone number 12. The tone number 12 is generated from a 1.44 MHz crystal oscillator 67 whose output is divided by 32 in divider 69 and applied to a 8-bit/32-word read only memory 71 so that the sin $w_{12}t$ may be read from the read only memory 71 and applied to the D/A converter 65. The read only memory output 71 is multiplied in the D/A converter 65 by $V_1(t)$ to form $V_1(t)$ sin $w_{12}t$, then filtered by filter 73 and, amplified by amplifier 71 to provide the tone 12.

The voltage $-V_1(t)$ plus a reference voltage is sent from amplifier 77 as $V_1(t)$ to a D/A converter 79. A crystal oscillator 81 generates a 1.568 MHz signal which is divided by 32 in divider 83 and applied to a read only memory 85. The sin $w-t$ is read from the read only memory 85 and applied to the D/A converter 79 where it is multiplied by $V_2(t)$. The resulting signal $V_2(t)$ sin $w_{13}t$ is the tone 13 signal which is filtered in filter 87 and amplified in amplifier 89 to become the tone 13 signal.

Figure 5:
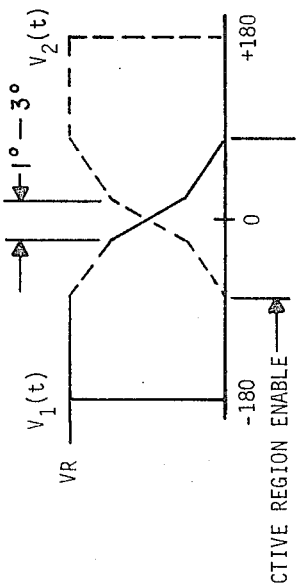
FIG. 5 shows the Elevation and Azimuth Relative Amplitude.

The tone 13 and tone 12 signals shown in FIG. 2 modulate the carrier signal and are transmitted by the azimuth transmitter 32 in FIG. 1. FIG. 5 shows the relative change of index of modulation (for a 1 degree site) for the two tones 12 and 13 versus the angle for 0 degrees. At a plus or minus 2.5 degrees the scale factors are 0.05 and 1 where the 1 factor indicates an index of modulation of 0.2 and the 0.05 factor indicates an index of modulation of 0.01. For a 3 degree site the degree scale would be multiplied by a factor of 3.

Figure 3:
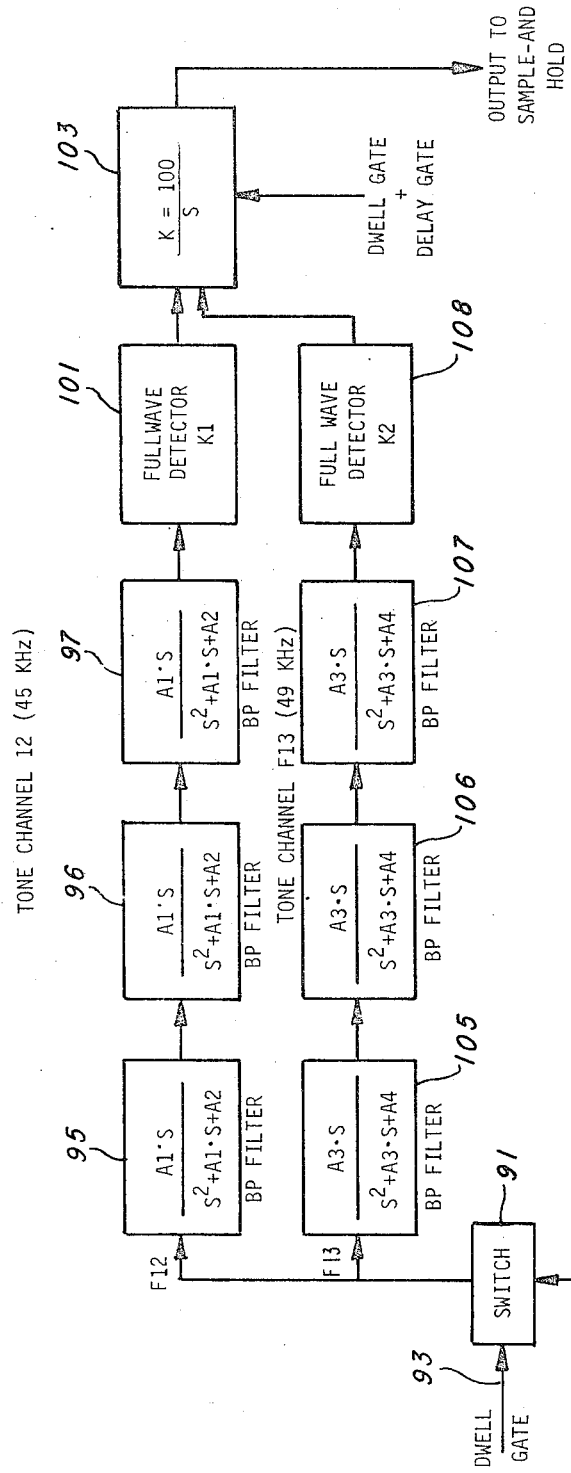
FIG. 3 shows a block diagram of the Airborne Decoder.

FIG. 3 shows a block diagram of the differential amplitude angle decoder in the airborne portion while FIG. 4 shows another block diagram of the airborne angle decoder. In FIG. 3 the angle tone signals T12 and T13 (along with all other baseband tones) are passed through a switch 91 to the decoder channels during the system swell gate time. The dwell gate signal is applied on input terminal 93. The angle input tone signals are separated into two channels F12 and F13. The F12 channel consists of three synchronous single tuned active filter stages 95 through 97 followed by full wave detector 101 and a common integrator 103 shared with the other channel. The other channel F13 also consits of three synchronous single tuned active filter stage 105 through 107 followed by a full wave detector 108 and shares the common integrator 103. The integrator output is passed to a sample and hold circuit which samples immediately following the dwell gate (if a valid condition exists). The 3 db bandwidth of each stage of the filter is 2 KHz, resulting in a 1 KHz overall 3 db bandwidth. The integrator 103 is normally clamped to 0 volts and is enabled only during the swell gate. The output of the sample and hold drives the angle error readout indicator via an isolation amplifier. FIG. 4 shows the decoder with the elevation baSeband signal applied on terminal 111 through two filters 113 and 115 and through two fullwave rectifiers 117 and 119 to a summing integrator and clamp 121. The output from the integrator 121 is applied through the sample and hold circuit 123 and the driver amplifier 125 go provide the output indicating the elevation to a course and direction indicator in the cockpit. The sample gate and the condition dwell gate inputs are applied through the OR circuit 127 to integrator 121 with the sample gate input applied directly to the sample and hold circuit 123. The azimuth input on input terminal 129 is applied through filters 131 and 133 and through rectifiers 135 and 137 to the integrator 139. The output from the integrator 139 is applied through the sample and hold circuit 141 and driver amplifier 143 to the azimuth input to the course and direction indicator. In addition, the sample gate and conditional dwell gate inputs are applied through OR circuit 145 to the integrator 139 with the sample gate input applied directly to the sample and hold circuit 141. Both the elevation and azimuth data rate inputs are applied to OR circuit 147 the output of which is coupled through an amplifier 149 to the course and direction indicator flag.

In FIG. 5 on the X axis the term 0 degrees represents the centerline of the runway for azimuth or in elevation it would represent the glideslope that has been selected for the airport. The AM modulated tones relative amplitude are set equal at the selected glideslope for elevation and are always set equal in amplitude at runway centerline for azimuth. The point at which the elevation tones relative amplitude are equal may be adjusted to be equal to any angle from 0 and plus 20 degrees.

What is claimed is:

1. An instrument landing system operable with a scanning beam antenna system for providing glideslope and runway centerline indications to an aircraft comprising:
   a. an azimuth antenna rotating in a plane parallel to the earth's surface;
   b. an elevation antenna rotating in a plane normal to the earth's surface;
   c. first means for generating a first pair of AM modulated tones representing the instantaneous position of said aximuth antenna, said tones having substantially equal amplitudes when the antenna is aligned with the runway;
   d. second means for generating a second pair of AM modulated tones representing the instantaneous position of said elevation antenna, said tones having substantially equal amplitudes when the antenna is aligned with the correct glideslope;
   e. azimuth transmitter means coupled to the azimuth antenna for generating a first carrier signal having a predetermined frequency, and elevation transmitter means coupled to the elevation antenna for generating a second carrier signal having a second predetermined frequency;
   f. means for FM modulating said first carrier signal with said first pair of tones and said second carrier signal with said second pair of tones;
   g. airborne means for receiving said first and second carrier signals;
   h. means for detecting when said first and second carrier signals are illuminating the position in space occupied by said aircraft; and
   i. means for detecting said two pairs of tones ane comparing their relative amplitude, wherein equal amplitudes indicate proper glideslope and/or centerline of runway.

2. The instrument landing system claimed in claim 1 wherein said FM modulating means includes baseband modulators.

3. The instrument landing system claimed in claim 2 including azimuth angle encoding means for encoding the instantaneous position of said azimuth antenna and inputting said position to said first generating means, and elevation angle encoding means for encoding the instantaneous position of said elevation antenna and inputting said position to said second generating means.

4. The instrument landing system claimed in claim 3 including means for indicating the relative glideslope of said runway.

5. The instrument landing system claimed in claim 4 where said first and second generating means are crystal oscillators generating pulses at predetermined rates and read only memories, said read only memories containing predetermined waveform values addressed by said crystal oscillators to provide said tone signals.

6. The instrument landing system claimed in claim 5 wherein said detecting and comparing means include means for separating each pair of tones into their separate channels, and means for indicating the error between said pairs of tones.

* * * * *